Nov. 26, 1940.   R. J. BURROWS ET AL   2,222,602
RAIL CAR TRUCK
Original Filed Jan. 6, 1936    6 Sheets-Sheet 3

Nov. 26, 1940.    R. J. BURROWS ET AL    2,222,602
RAIL CAR TRUCK
Original Filed Jan. 6, 1936    6 Sheets-Sheet 4

Inventors:
Robert J. Burrows,
Alfred O. Williams.
By Brown, Jackson, Boettcher & Dienner
Attys.

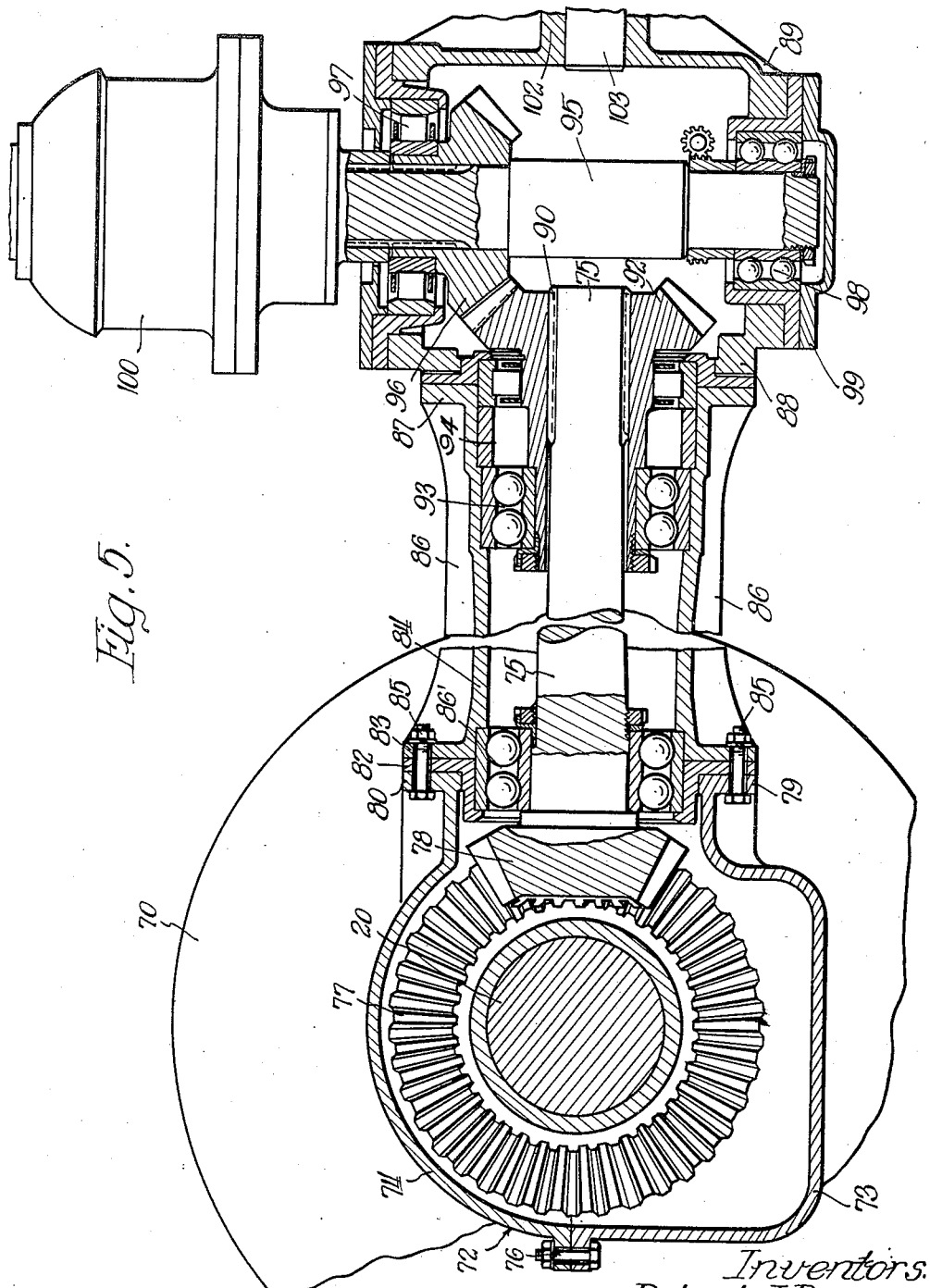

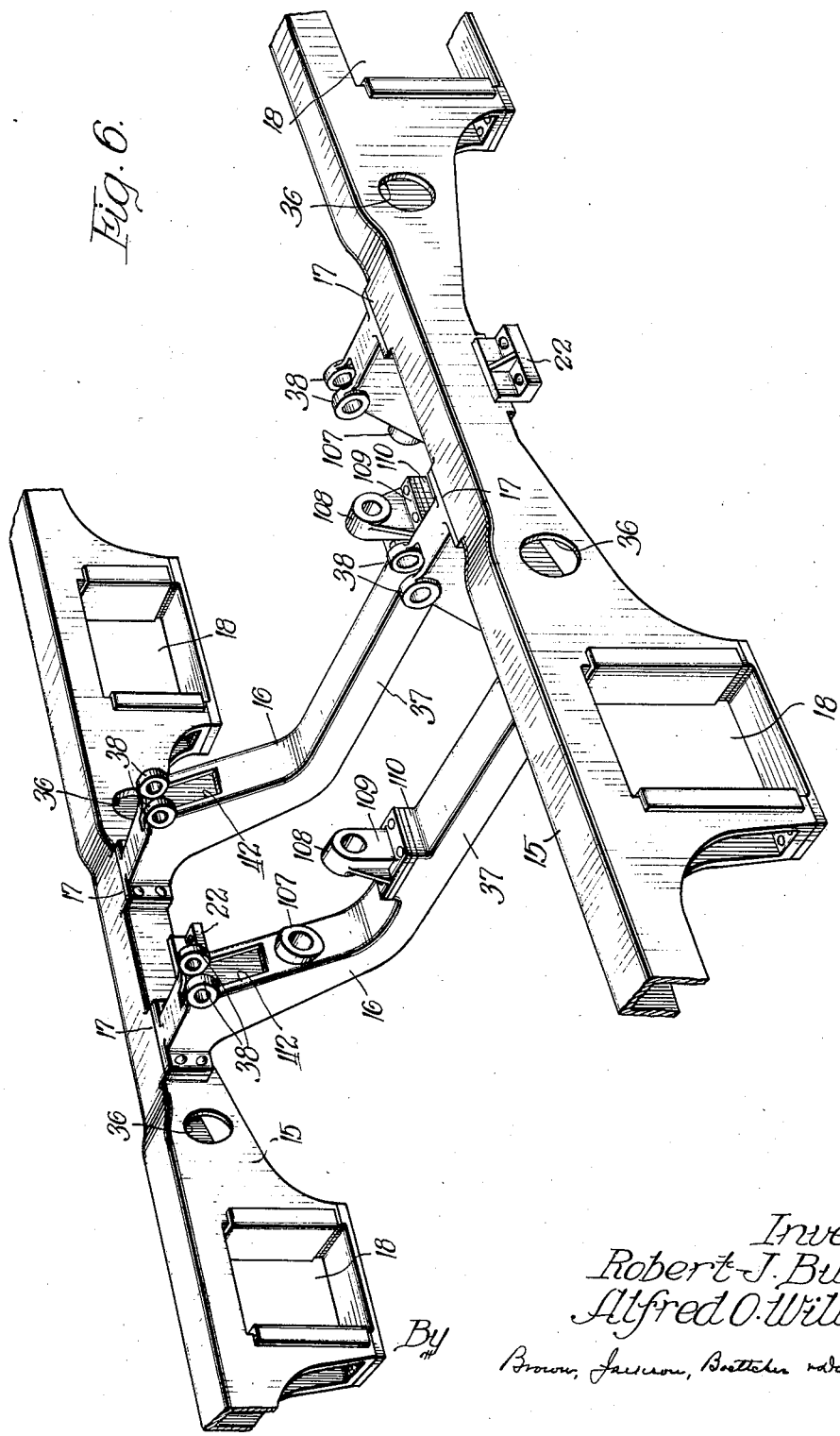

Patented Nov. 26, 1940

2,222,602

UNITED STATES PATENT OFFICE 2,222,602

RAIL CAR TRUCK

Robert J. Burrows and Alfred O. Williams, Battle Creek, Mich., assignors, by mesne assignments, to Clark Equipment Company, Buchanan, Mich., a corporation of Michigan Application January 6, 1936, Serial No. 57,747
Renewed January 23, 1939

35 Claims. (Cl. 105—117)

Ths invention relates to vehicle drive trucks, and more particularly is directed to a drive truck construction for a rail vehicle, such as a rail car or the like.

More particularly, the present invention comprises a drive truck for a rail car of the type shown in the pending application of Robert J. Burrows, Robert Lapsley and Alfred O. Williams, Serial No. 58,712, filed Jan. 11, 1936, which has since matured into U. S. Patent No. 2,150,150, granted March 14, 1939, although its use is not limited to this particular type of car or drive, but may be employed with any desired type of car and drive transmission.

In the provision of a driving truck for cars of this type, which are relatively light in weight and are driven at high speeds, consideration must be given not only to the structural design of a truck as far as load carrying capacity is concerned, but also the suspension of the car on the truck requires a design whereby relatively free floating action of the truck is attained during such high speed operation. This is necessary in order to absorb shocks and impacts due to track inequalities, and to prevent, as far as possible, any transmission of such shocks or impacts to the car body.

In the braking of such vehicles at the high speeds which they attain, a considerable stress is imposed on the trucks, which stress must be absorbed or counteracted, if possible, to prevent damage to the trucks, or transmission of these braking reactions to the car body. It has heretofore been general practice to provide separate torque arms or supporting members for taking these braking reactions, which adds to the weight of the truck assembly and also increases the cost of the assembly.

Previous truck constructions with which we are familiar in which more than one axle of the truck was employed as a driving axle, usually had the drive transmitted from a vertical shaft through suitable differential mechanism forwardly and rearwardly to the driving axles, the mechanism being more or less rigidly supported on the truck frame. This prevented, to a large extent, the flexibility and floating action which is essential to the attainment of high speed operation of such a vehicle, without resultant swaying and jarring of the car body.

The primary object of the present invention is the provision of a drive truck for vehicles of this type in which relatively free floating movement of the truck is attained with respect to the car body, thereby producing a structure capable of high speed operation while retaining smooth riding characteristics in the car body.

Another object of the present invention is to provide a truck construction in which the bolster for the car body is mounted in a cradle assembly which is swung transversely of the car body between the side frames of the driving axles and truck frame without substantial corresponding side thrusts on the car body.

Another object of the present invention is the provision of a truck in which each of the axles may be driven separately, with separate vertical drive shafts extending centrally of the truck on opposite sides of the king pin bolster mounting. These shafts are connected with bevel gear sets and drive shafts extending forwardly and rearwardly, respectively, to the axles. The housings supporting the bevel gear sets and horizontally extending drive shafts are universally supported at one end on the transverse bolster assembly of the truck, and at the opposite end on the axle housing.

In this connection, one advantage secured by this construction is the elimination of the separate torque arms, since the housings themselves take the braking reactions from the axles.

Another feature of the present invention resides in the particular spring mounting employed for the longitudinally extending leaf spring members on the side frames or equalizer bars of the truck, whereby the ends of the spring members are pivotally hung on the side frame members while the spring brackets or supports are resiliently mounted on the same frame members, giving an exceptionally high degree of shock absorption for the truck.

Another advantage provided by the present invention resides in the arched cradle assembly whereby the car body is supported on the truck. This assembly is underslung and provided with reinforcing tension members whereby the center of gravity of the entire vehicle is lowered without sacrificing any of the desired flexibility of the mounting.

Other obpects and advantages of the present invention will appear more fully from the following detailed description, which, taken in conjunction with the accompanying drawings, will disclose to those skilled in the art the particular construction and operation of a preferred form of the present invention.

In the drawings:

Figure 5 is a vertical sectional view through one of the drive transmitting means; and Figure 6 is a perspective view of the truck frame.

Figure 1:
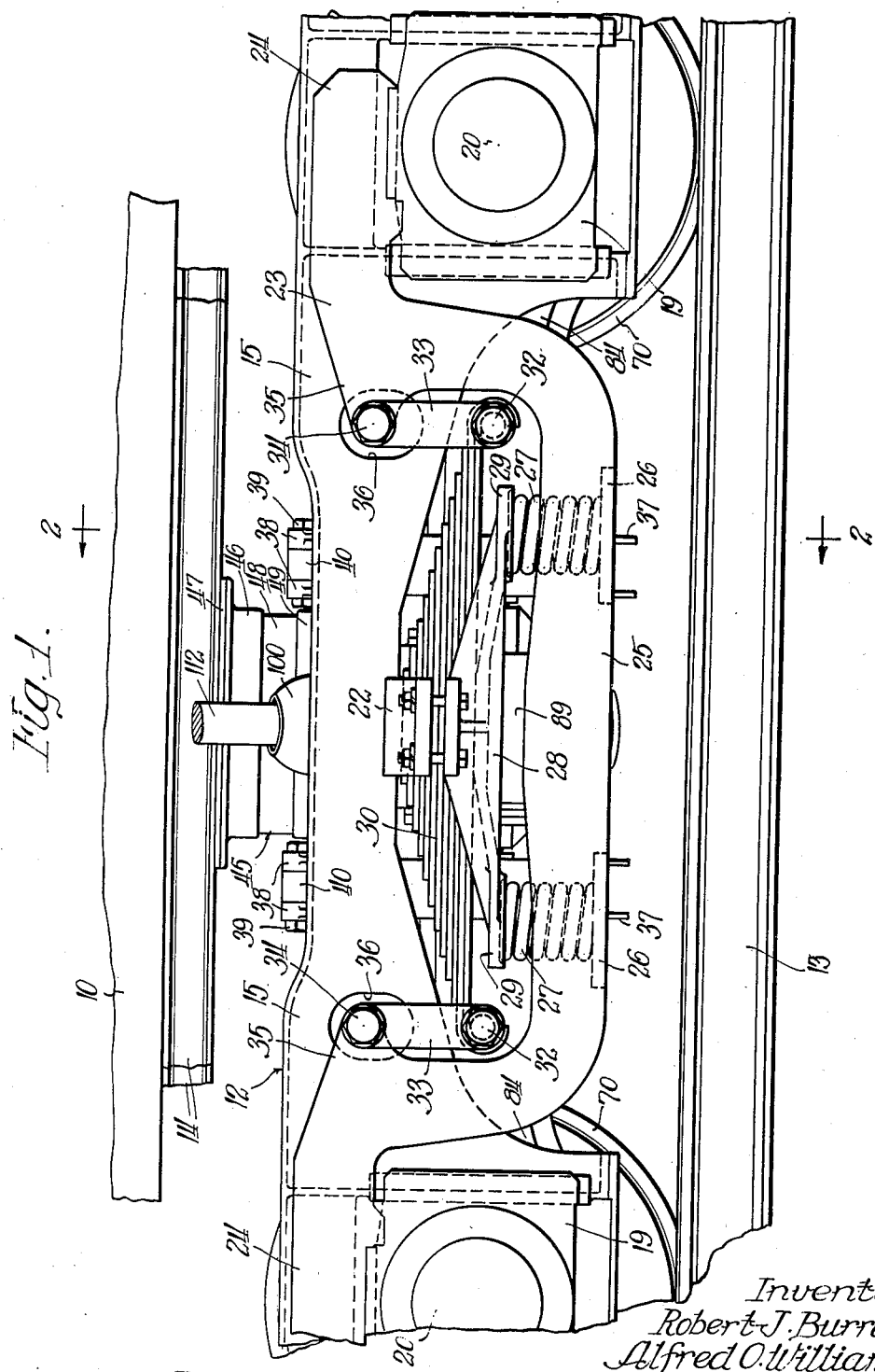
Figure 1 is a side elevational view of a preferred form of the present invention.

Referring now in more detail to the drawings, we have indicated at 10 the body of a rail car or similar vehicle which is provided with the longitudinally extending beams 14, supported beneath the floor of the car. The car is mounted upon a plurality of trucks indicated generally at 12, which trucks support the car for movement along the rails 13.

The trucks 12 comprise side channel members 15, and, as shown more in detail in Figure 6, are spaced apart by transverse channel members 16, secured at their ends to bosses 17 formed on the inner facing surfaces of the beams 15, at spaced points on opposite sides of the transverse center of the truck. Intermediate the bosses 17 there are provided upper spring bracket members 22, rigidly secured to the bottom edges of the central portion of the channel members 15. The spacing channels 16 may be riveted, bolted, or otherwise suitably secured to the side channels 15. The side channels 15 are also provided, adjacent their ends, with openings 18 adapted to receive the journals 19 carrying the driving axles 20.

Disposed on opposite sides of each of the channel members 15 of the truck are equalizer bars or plate members 23 which at their ends 24 are suitably supported on the top surfaces of the journals 19 in the conventional manner. Intermediate their ends the equalizer bars are provided with downwardly offset portions 25 which are provided with transversely extending plate members 26, welded or otherwise suitably secured therebetween, and forming supporting surfaces for the coiled spring members 27. The lower spring bracket 28 is provided with oppositely extending foot portions 29 which are recessed in their lower surfaces to form suitable seats receiving the upper ends of the springs 27. The lower spring bracket 28 is thus resiliently supported on the springs 27 and biased against the central portion of the equalizer bars.

Between the spring brackets 22 and 28 there is disposed a suitable leaf spring member 30 which has oppositely extending end portions secured to pivot pins 32, carried at the lower end of link members 33. The links 33 are pivotally suspended from pivots 34 carried by offset portions 35 of the equalizer bars, the pivots 34 extending through elongated openings 36 formed in the side walls of the channels 15.

Referring now in detail to Figure 6, it will be noted that the transverse channels 16 are provided with dropped central portions 37 disposed below the horizontal plane of the bosses 17. Adjacent their ends, each of the channels 16 is provided with pairs of inwardly and upwardly extending ears 38 which are adapted to receive a pivot pin 39 therebetween for supporting a downwardly extending link 40 therebetween. The link 40 projects through a cut-out portion 42, formed in the web of the channels 16 on opposite sides of the ears 38, whereby the link has limited rotational movement about the pivot 39 within the side walls of the channels.

The lower ends of each of the links 40 extending downwardly from each of the four pairs of ears 38 are provided with pivot pins 43, and the transversely opposite pins 43 are engaged by transversely extending bar members 44, providing for rigid transverse spacing of the lower ends of the pair of links carried by each of the channels 16.

The undersurface of the car body 10 is provided with a pair of longitudinal angle members 46 secured to a plate 47 extending lengthwise of the car below the beams 14. A pair of laterally spaced vertical plate members 48 are secured at their upper ends to angle members 46, and at their lower ends are secured to angle members 49 carried by plate 50. The plate 50, at spaced intervals, is provided with the car bolster brackets 52 secured to the bottom surface thereof, and forming the car bolsters indicated generally at 45.

Each of the bolster brackets 52 is provided with a downwardly offset cylindrical portion 53, carried within a cylindrical flanged or cup-shaped member 54, having a central boss portion 55 receiving the king pin 56. The bracket 54 is resiliently supported in a rubber or similar resilient cushioning member 57 carried in a central cradle 58, formed integrally with the truck bolster. Preferably, a suitable bronze bearing ring 59 is disposed for floating movement between the lower surface of the bracket 52 and the annular surface within bracket 54.

Figure 2:
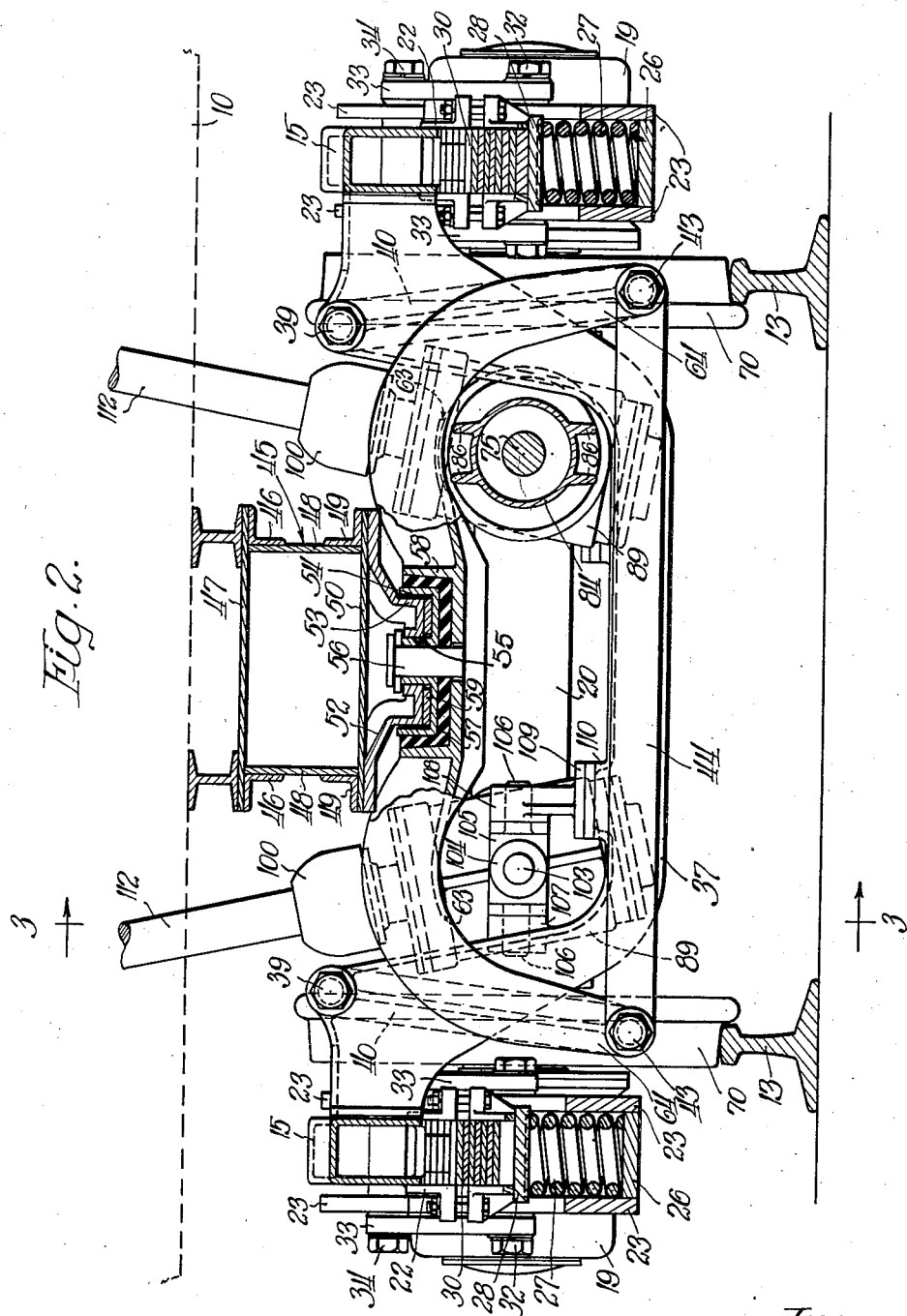
Figure 2 is a transverse sectional view taken substantially on line 2—2 of Figure 1.
Figure 3:
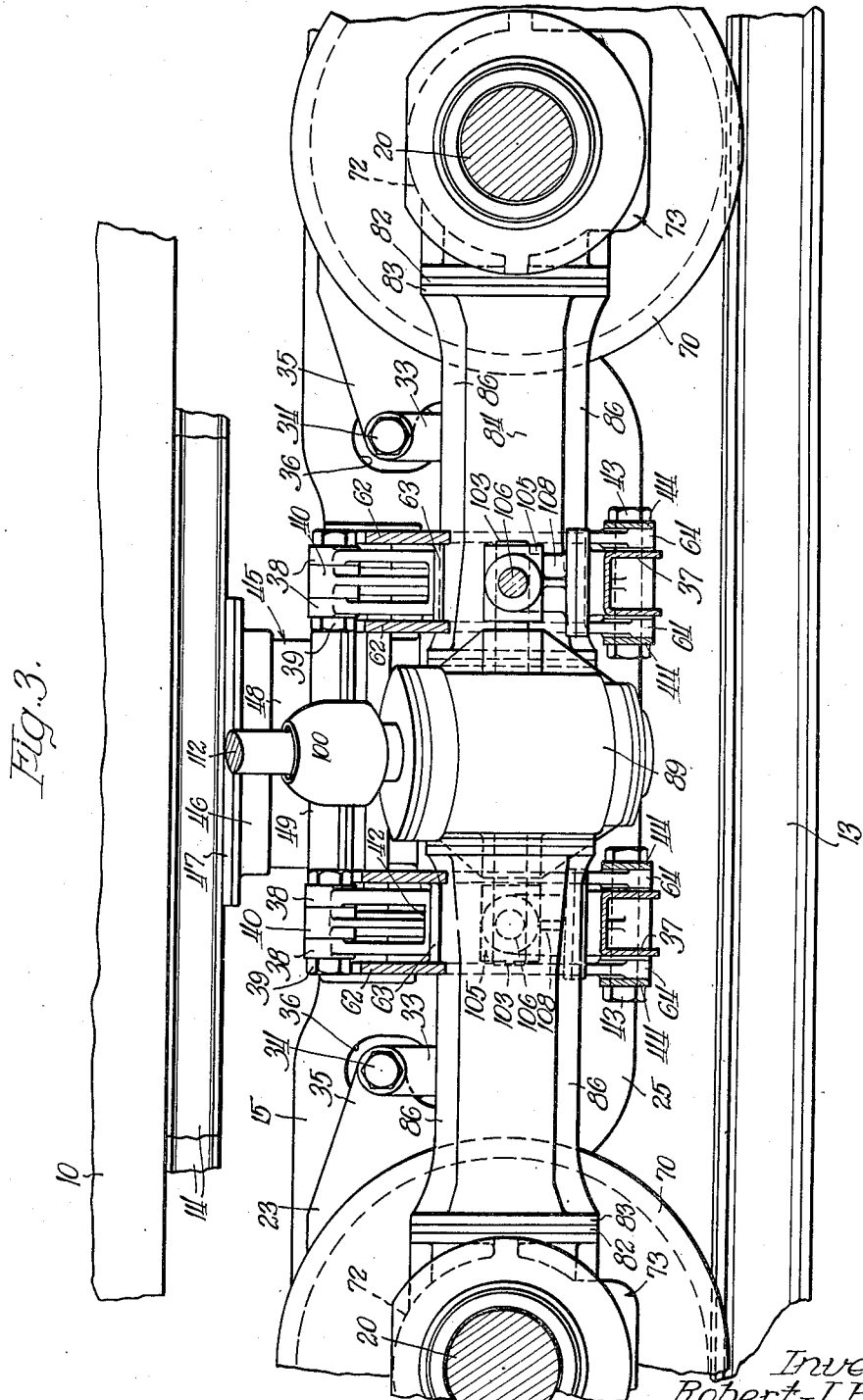
Figure 3 is a longitudinal sectional view taken on line 3—3 of Figure 2.
Figure 4:
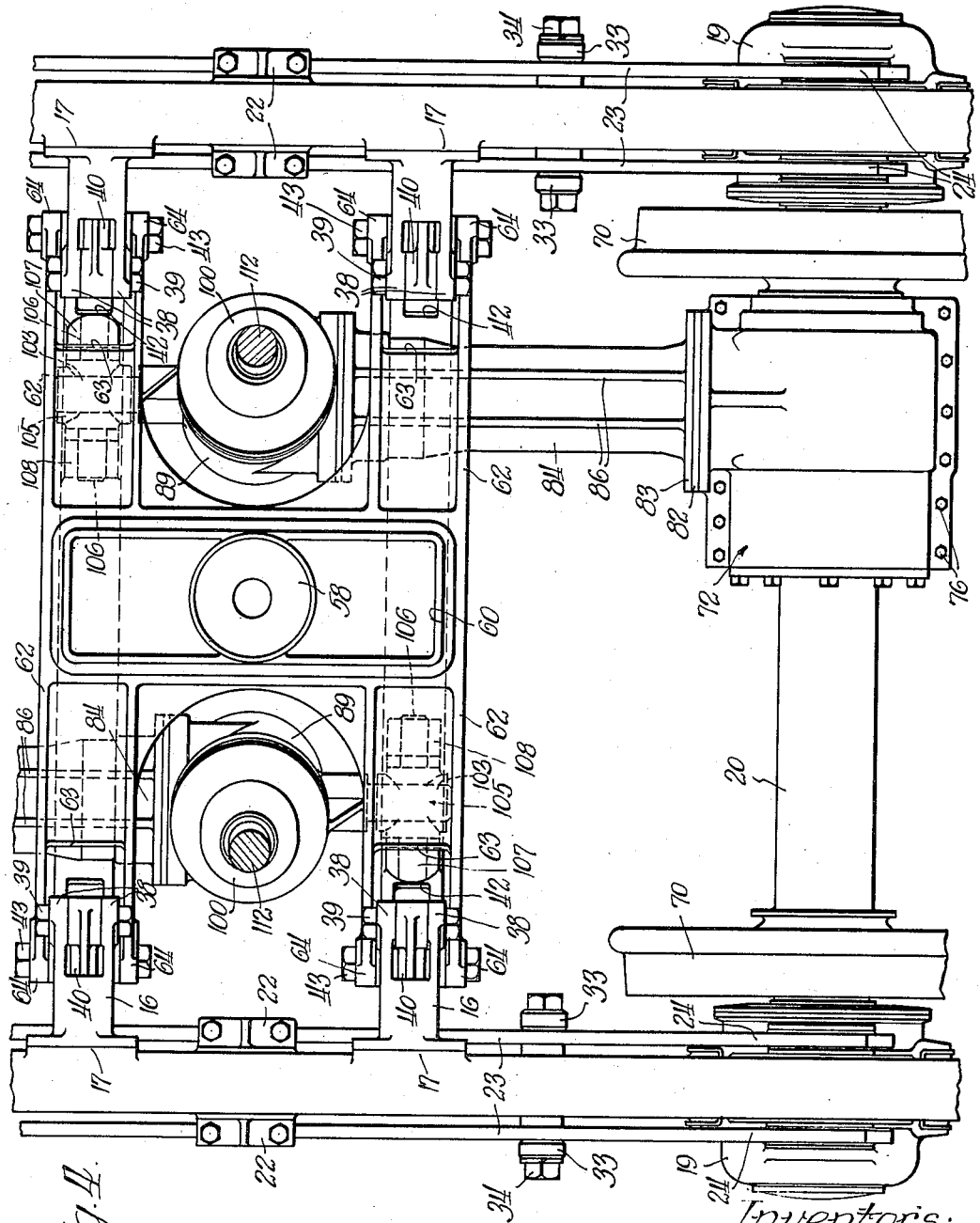
Figure 4 is a top plan view of a portion of the truck.

The truck bolster 60 comprises a unitary member having a substantial rectangular portion 61 as shown in Figure 4, provided with oppositely extending pairs of arms 62 projecting normally to the longitudinal axis of the portion 61. These pairs of arms comprise channel sections which are curved substantially as shown in Figure 2, the web portion of the channel terminating at 63 to provide extending parallel spaced pairs of arms 64 which are pivotally mounted on the pins 43 carried by the links 40

It will thus be apparent that the truck bolster 60 is mounted on the links 40 for transverse swinging movement between the side channels 15, whereby, upon the truck being subjected to side thrusts caused by inequalities in the track surface, the truck can swing sidewise with respect to the car body without imparting any shocks or jolts to the car. This is also accommodated to some extent by the rubber cushioning member 57. The members 44 tied between the links 40 serve as tension members, thus preventing outward spreading of the arms 64 of the truck bolster under the weight of the car.

Also it will be apparent that with this type of cradle mounting the bolster of the car is supported at a point substantially below the plane of the side channel members and closely adjacent the horizontal plane through the axles of the truck. This considerably lowers the center of gravity of the car body, which is distinctly advantageously for high speed operation of the vehicle.

In the present construction, each of the axles constitutes a driving axle and is provided with the drive wheels 70 pressed onto the axle shaft for conjoint rotation therewith. Intermediate the wheels 70 of each of the axles 20 there is provided a housing 72 having a lower portion 73 and an upper portion 74, as shown in detail in Figure 5, which are bolted together as indicated at 76. The shaft or axle 20 extends through the housing 72 and a suitable ring gear 77 is secured on the axle 20 within the housing 72, preferably being pressed onto the axle under a pressure of from 50 to 80 tons. The ring gear assembly 77 is engaged for driving movement by a pinion 78, preferably formed integrally with the drive shaft 75. The housings 73 and 74 are provided at the inner side thereof with outwardly extending flange portions 79 and 80, respectively, which are engaged by a suitable bearing retaining ring 82 which is clamped between the flanges 79 and 80 and a corresponding flange 83 carried by the tubular drive shaft housing 84. Suitable bolts 85 secure the flanges together and hold the ring 82 in fixed position. Bearing means 86' is disposed about the outer end of the shaft 75, adjacent the pinion 78. The housing 84 is provided externally with longitudinally extending reinforcing ribs 86 which strengthen the same against bending.

The inner end of the housing 84 is provided with the outwardly extending flange 87 which is suitably secured to the side plate 88 of a housing indicated generally at 89. The inner end of the drive shaft 75 is splined as indicated at 90 to receive the beveled gear 92 which is non-rotatably mounted thereon. The gear 92 is provided with a tubular portion overlying the shaft 75 and supported by suitable bearings 93 and 94 within the inner end of the housing 84, whereby the inner end of the drive shaft 75 is supported for rotation within housing 89. The housing 89 is adapted to contain a vertical upwardly and outwardly extending shaft 95 which carries the beveled gear 96 splined thereto and supported in suitable bearings 97 within the upper end of the housing 89 for driving the shaft 75 through the gear 92.

The shaft 95 is supported at its lower end in suitable bearings 98 carried by bottom closure plate 99 of the housing 89. The upper end of shaft 95 extends into a suitable flexible coupling member indicated generally at 100, and through this coupling is connected to suitable drive transmitting means.

The housing 89, opposite the side 88 which is connected to the housing 84, is provided with a suitable boss 102 extending substantially coaxial with the shaft 75. This boss is adapted to receive a stub shaft 103 which projects rearwardly of the housing 89 and is received within a suitable bearing portion 104 of a bracket 105 having normally extending trunnions 106 which are mounted for rotation within a boss 107 formed integrally with the member 16 and the boss portion 108 of a bracket 109 which is bolted or otherwise suitably secured on the raised portion 110 formed in the lower downwardly offset portion 37 of the member 16. This provides for substantially universal movement of the stub shaft 103 with respect to the truck frame.

It will be noted that some clearance is provided between the bracket 105 and the adjacent end faces of bosses 107 and 108, whereby slight lateral shifting of the housing 89 is accommodated by the lateral movement of the bracket 105 on its trunnions 106. Thus two separate drive transmitting means are provided—one extending forwardly to the front axle on one side of the longitudinal center of the truck, and the other extending rearwardly to the rear axle on the opposite side of this center. The inner ends of these drive transmitting means overlap beyond the transverse center of the truck and are supported on opposite portions of the transverse channels. It will also be noted that the stub shaft 103 provides a support for the drive transmitting means on the rigid transverse channels 16 at points offset with respect to the transverse center of the truck and free from the channel over which the housing 84 extends. By the provision of the strengthened housing 84 and the universal support of the stub shaft carried by the housing 89 on the transverse channels of the frame, the braking reactions transmitted by the axles 20 through the housing 84 are transmitted to the respective channels 16 upon which these housings are supported, and thus to the truck frame. Thus no separate torque reaction members are necessary, as such torque reactions are taken care of by the housings which carry the drive transmitting means. As will be apparent, the reaction arms are of a length greater than half the length of the truck and produce a well balanced and effective reaction means tending to provide stability during braking.

It is desirable that the drive shafts 112 which extend upwardly through the floor of the car body 10 be disposed at an angle so that their lower ends are spaced more closely toward the center of the truck than are the upper ends. This provides for producing as centralized a drive as is possible with a construction in which two power units are laterally spaced above the truck on the floor of the car body, as described in detail in the above-mentioned patent of Burrows, Lapsley and Williams.

Also, by reason of the flexible couplings 100 and the slight lateral movement which is provided by the trunnions 106, the drive transmitting means is capable of performing efficiently, in spite of lateral jolting of the truck. It will be noted that the housings 84 extend freely through the arch or opening formed by the arms 64 of the truck bolster, and the central downwardly offset portions 37 of the spacing members 16, whereby the housings are supported only at the axle and at the remote transverse spacing member of the truck, but are free from support at any other point of the truck. If desired, the mounting of the stub shaft 103 can be modified to provide a resilient cushioned mounting, with the use of rubber shackle members or the like to provide a more quiet construction.

It will also be noted that the entire weight of the car is transmitted to the axle journals through the springs 27 and 30, independently of any rigid connections. Since the weight of the car is transferred from the truck bolster 60 through the links 40 to the side channels 15, and from these channels through the springs 30 and 27 to the equalizer plates 23 supported on the tops of the journals 19, any jolting or jarring movement of the axles 20 will be modified by the springs 27 and 30 so that substantially no sharp impacts or shocks are transmitted to the passengers within the car.

While we are aware that various modifications and changes may be made in the construction disclosed, we do not intend to be limited to the specific structure claimed, but only insofar as defined by the scope and spirit of the appended claims.

We claim:
1. In a truck of the class described, a pair of driving axles, a pair of laterally spaced frame members between said axles, a cradle pivotally mounted for transverse movement within the space between said frame members, a car body pivotally mounted on said cradle, and drive transmitting means extending downwardly from said car body on opposite sides of the pivotal mounting thereof and including forwardly and rearwardly extending drive means supported on said axles and on said frame members.

2. In a truck of the class described, a pair of spaced side frame members, rigid transverse U-shaped spacing channels therebetween having central dropped portions and the ends thereof secured to said side frame members, and inverted U-shaped cradle member having outwardly and downwardly curved bifurcated ends extending downwardly about the leg portions of said spacing channels to a point substantially coplanar with the central dropped portions of said channels, and link means pivoted at one end on said channels adjacent said side frame members and at the other end on the ends of said cradle member whereby said cradle member has transverse swinging movement between said side frame members.

3. In a truck of the class described, a pair of rigidly spaced side frame members, an upwardly arched cradle mounted for transverse swinging movement between said members and having outwardly and downwardly extending ends, driving axles at opposite ends of said side frame members, and horizontally extending drive means laterally offset on opposite sides of the center of said truck and extending from beneath said cradle to said axles, said drive means being universally supported in overlapped position on said side frame members.

4. A driving truck for a vehicle comprising laterally spaced side channels, transverse driving axles journaled in opposite ends of said channels, a pair of equalizer members supported on opposite sides of each of said channels at the axle journal portions thereof, said equalizer members having central dropped portions spaced below the central portion of said side channels, spring means between said central portions, said spring means comprising a longitudinal leaf spring member rigidly supported at its center on the under surface of said central portion of said channel against upward movement and pivoted at its ends to said equalizer members, and bracket means secured to said central spring support and having spaced resilient support at the ends thereof on said equalizer members for supporting the center of said spring member against downward vertical movement.

5. A driving truck for a vehicle comprising a pair of driving axles, longitudinally extending side channels having journals at opposite ends thereof receiving the ends of said axles, drive means extending from said axles toward the center of said truck and laterally offset on opposite sides of the longitudinal center thereof, the inner ends of said drive means overlapping the transverse center of said truck, said ends being supported on transverse inwardly extending portions of said channels, and upwardly and outwardly extending drive transmitting means connected to said ends and extending in a plane passing through the transverse center of said truck.

6. A driving truck for a vehicle comprising a pair of longitudinally spaced axles having drive wheels adjacent the ends thereof, side channel members having means for journalling the ends of said axles, laterally extending spacing members rigidly connected between said channel members on opposite sides of the transverse center of said truck, a bolster cradle pivotally mounted for lateral swinging movement between said spacing members, drive transmitting means extending downwardly into said truck between said spacing members on opposite sides of the longitudinal center of said truck, and horizontal drive means extending forwardly from one of said drive transmitting means between said cradle and said spacing members to one axle and rearwardly from the other of said drive transmitting means between said cradle and said spacing members to the other axle.

7. A driving truck for a vehicle comprising a pair of longitudinally spaced axles having drive wheels adjacent the ends thereof, side channel members having means for journalling the ends of said axles, laterally extending spacing members rigidly connected between said channel members on opposite sides of the transverse center of said truck, drive transmitting means extending downwardly into said truck between said spacing members on opposite sides of the longitudinal center of said truck, and horizontal drive means extending forwardly from one of said drive transmitting means to one axle and rearwardly from the other of said drive transmitting means to the other axle, and means for universally supporting the inner ends of said drive means on said spacing members.

8. A driving truck comprising a pair of side channel members, transverse axles journaled between opposite ends thereof, a bolster cradle mounted for lateral swinging movement between said channel members intermediate said axles, rigid spacing means between said channel members below said bolster cradle, an inwardly and downwardly extending drive shaft disposed laterally of the center of said cradle, a horizontal drive shaft supported at one end on one of said axles and extending to the lower end of said first-named shaft, a torque reaction housing enclosing said horizontal drive shaft and the lower end of said first-named drive shaft, and means for supporting said housing at its free end on said spacing means.

9. A driving truck comprising a pair of side channel members, transverse axles journaled between opposite ends thereof, a bolster cradle mounted for lateral swinging movement between said channel members intermediate said axles, rigid spacing means between said channel members below said bolster cradle, an inwardly and downwardly extending drive shaft disposed laterally of the center of said cradle, a horizontal drive shaft supported at one end on one of said axles and extending to the lower end of said first-named shaft, a torque reaction housing enclosing said horizontal drive shaft and the lower end of said first-named drive shaft, and means for supporting said housing at its free end on said spacing means, for universal movement with respect thereto.

10. A driving truck comprising a pair of side channel members, transverse spacing members rigidly secured therebetween and having a dropped central portion intermediate their ends, pivots formed on said spacing members adjacent said channel members, links depending from said pivots, a bolster member having a central bolster mounting portion disposed below the plane of said channel members and having outwardly and downwardly curved arms extending to a point substantially co-planar with said dropped central portions, the transverse distance between said arms being greater than the distance between said pivots, the ends of said arms being connected to the lower ends of said links whereby said bolster member has transverse swinging movement between said side channel members.

11. In a drive truck having a pair of longitudinally spaced transverse axles, independent drive means extending to each of said axles, a truck frame including transversely spaced side frames each side frame comprising a channel member having journal boxes for said axles at the ends thereof accommodating vertical movement of said axles, a pair of equalizer bar plates on opposite sides of said member and supported on said axles, spring bracket means on said channel member, a spring bracket resiliently supported on said plates below said bracket means, a spring clamped intermediate its ends between said bracket means and said bracket, links pivotally supported on said plates independently of said channel member, means connecting the ends of said spring to said links, and a truck bolster transversely cradled upon said side frames.

12. In combination, a driving truck comprising a pair of side beams, a truck bolster mounted for transverse swinging movement therebetween, axles at opposite ends of said beams, drive shafts for said axles extending in laterally offset planes longitudinally of the truck, drive means extending downwardly through said bolster and engaging the end of each of said shafts, said shafts and drive means being supported on said truck independently of said bolster.

13. In a rail car truck, a pair of driving axles, a pair of laterally spaced frame members between said axles, transverse rigid spacing members between said frame members, spaced intermediate said axles, car supporting means pivoted on said spacing members for transverse swinging movement, laterally offset drive means extending from each of said axles toward the transverse center of said truck, the extending ends of said drive means being supported in overlapped position on said spacing members, and means extending vertically from each of said drive means between said spacing members for transmitting torque thereto.

14. In a rail car truck, a pair of driving axles, a truck frame comprising side channels having journal portions for said axles and parallel transverse spacing members having dropped central portions and disposed on opposite sides of the transverse center of said frame, horizontal drive means extending from each axle beyond the said transverse center of said truck and laterally offset on opposite sides of the longitudinal center of said frame, vertical drive transmitting means engaging each of said drive means intermediate said spacing members, and means on said spacing members providing universal support for the extending ends of said drive means.

15. In a rail car truck, a truck frame having parallel side frame members spaced apart by rigid U-shaped transverse members disposed on opposite sides of the transverse center of said frame, a bolster transversely cradled on the ends of said spacing members transversely extending axles journaled for vertical movement in opposite ends of said side frame members, equalizer plates carried by said axles and having dropped central portions extending beneath said side frame members, leaf spring members having central support on said side frame members between said spacing members, links carried by said plates and pivotally connected to the ends of said spring members, bracket members resiliently supported on the dropped central portions of said plates, and means for securing the intermediate portions of said spring members to the upper surface of said bracket members.

16. In a rail car truck, a truck frame having transversely disposed driving axles at opposite ends thereof, parallel transverse spacing members intermediate the ends of said frame, laterally offset drive means extending from each axle over one of said members and universally supported on the other of said members, and means extending vertically from each of said drive means intermediate said members for transmitting torque to the respective drive means.

17. In combination, a truck frame having drive axles journaled at opposite ends thereof, transverse U-shaped spacing members connected to said frame intermediate said axles, an inverted U-shaped bolster cradle pivoted for transverse swinging movement on said spacing members and defining therewith longitudinally extending openings on opposite sides of the longitudinal center of said truck frame, and drive means extending from each axle through the adjacent opening and supported against braking reactions on the spacing member defining the second opening.

18. In combination, a truck frame having drive axles journaled at opposite ends thereof, transverse U-shaped spacing members connected to said frame intermediate said axles, an inverted U-shaped bolster cradle pivoted for transverse swinging movement on said spacing members and defining therewith longitudinally extending openings on opposite sides of the longitudinal center of said truck frame, and driving means extending horizontally from each axle through one of said openings and universally supported at the free ends thereof on one of said spacing members.

19. In combination, a truck frame having drive axles journaled at opposite ends thereof, transverse U-shaped spacing members connected to said frame intermediate said axles, an inverted U-shaped bolster cradle pivoted for transverse swinging movement on said spacing members and defining therewith longitudinally extending openings on opposite sides of the longitudinal center of said truck frame, drive means extending from each axle through the adjacent opening and supported against braking reactions on the spacing member defining the second opening, and means extending vertically from said drive means intermediate said spacing members and out of contact with said bolster cradle for transmitting torque to said drive means.

20. In a truck, a frame having transverse driving axles journaled at opposite ends thereof, longitudinally spaced rigid parallel transverse spacing members in the center of said frame having dropped central portions, a bolster mounted for transverse swinging movement about said spacing members and disposed above said dropped center portions, and horizontal drive means extending from each axle through the vertical openings between the adjacent spacing member and bolster portion thereabove and universally supported at the end on the remote spacing member.

21. A supporting truck for a wheeled vehicle comprising a truck frame having a rigid transverse spacing member provided with a central dropped portion, a vehicle body bolster extending transversely across the frame above the central dropped portion of the spacing member, and having downwardly curved ends disposed in the plane of said dropped portion and pivot links between the ends of said bolster and the ends of said spacing member.

22. In a supporting truck for a wheeled vehicle comprising a truck frame having a rigid transverse spacing member provided with a central dropped portion, a vehicle body bolster extending transversely across the frame above the central dropped portion of the spacing member, and having downwardly curved ends disposed laterally outwardly of said central portion, vertically extending pivot links between said ends of said bolster and the ends of said spacing member, and a transverse tension member connected between the ends of said bolster substantially in the plane of said central dropped portion.

23. A four-wheeled driving truck comprising a truck frame including transverse axles at opposite ends thereof, spring means for cushioning relative vertical movement of said axles with respect to said frame, a pair of rigid transverse spacing members carried by said frame between said axles, a body supporting member pivotally supported on said spacing member for transverse swinging movement with respect to said frame and spaced above the central portion of said spacing members to form longitudinal openings therebetween, and drive means extending from each axle longitudinally of said truck toward the center thereof through the adjacent opening and having universal torque reaction support on the remote spacing member.

24. A four-wheeled driving truck comprising a truck frame including transverse axles at opposite ends thereof, spring means for cushioning relative vertical movement of said axles with respect to said frame, rigid transverse spacing members carried by said frame between said axles, body supporting means pivotally mounted on said spacing members for transverse swinging movement with respect to said frame, drive means extending longitudinally from each of said axles toward the center of said truck in laterally offset relation, and independent torque transmitting means extending vertically between said spacing members and respectively connected at the lower ends thereof to said drive means.

25. In a car truck, a truck frame, transverse axles journalled at opposite ends thereof, a pair of rigid transverse spacing members secured to said frame intermediate said axles and having dropped central portions, a body supporting member having spaced arms pivotally supported from adjacent opposite ends of said spacing members and having an upwardly arched central portion whereby said central portions define therebetween longitudinally extending openings, laterally offset drive means extending longitudinally from each axle through said openings, and having torque reaction support at their ends on the respectively remote spacing members, and torque transmitting means connected to each of said drive means between said spacing members and extending vertically between the spaced arms of said body supporting member.

26. The combination, with a truck having side frame members spaced apart by a pair of rigid transverse U-shaped spacing members, of a body supporting member comprising a central bolster portion having a pair of spaced downwardly and outwardly curved arm portions projecting from each side thereof, said arm portions being bifurcated for an appreciable distance to receive the adjacent portions of said spacing members, and links pivoted at one end to the ends of said spacing members and extending therethrough for pivotal connection at their opposite ends to the bifurcated ends of said arm portions.

27. In a truck frame, a pair of side frame members, transverse driving axles at opposite ends of said members, spring means cushioning said frame members relative to said axles, transversely extending rigid spacing members between said side frame members having downwardly offset intermediate portions, links pivotally depending from fixed pins extending longitudinally on the inboard sides of said side frame members, an upwardly arched body supporting member mounted at its ends on the lower ends of said links providing for transverse swinging movement of said body supporting member in a single plane between said side frame members, and substantially horizontally extending drive means extending in opposite directions from each axle in laterally offset relation, said drive means extending out of contact with the respective adjacent spacing members and beneath the body supporting member and supported in overlapping relation on the respective remote spacing members.

28. In a truck, a pair of longitudinally extending side frame members, a body supporting member having a bolster portion disposed substantially in the center of the truck and having outwardly and downwardly extending ends, links having direct pivotal connection between said ends and said frame members limiting said body supporting member to transverse swinging movement in a single plane and limiting vertical movement thereof, spacing members extending transversely between said side frame members on opposite sides of said bolster portion, transverse axles at opposite ends of the truck, and laterally offset independent drive means extending horizontally from each axle and supported at their remote ends on the remote spacing members in overlapping relation, said drive means passing over a portion of the adjacent spacing member and beneath the body supporting member and being free for movement relative thereto.

29. In a truck, a frame having longitudinally extending side frame members, transverse driving axles journalled at opposite ends thereof, longitudinally spaced rigid parallel transverse spacing members in the center of said frame having dropped center portions, a bolster mounted for transverse swinging movement between said side frame members and disposed above said dropped center portions, and horizontal drive means extending from each axle through the vertical openings between the adjacent spacing member and bolster portion thereabove and supported at the end on the remote spacing member.

30. In a truck of the class described, a pair of rigidly spaced side frame members, an upwardly arched cradle mounted for transverse swinging movement between said members, driving axles at opposite ends of said side frame members, spring means cushioning said side frame members on said axles, and horizontally extending drive means laterally offset on opposite sides of the longitudinal center of the truck and extending from beneath the arched portion of the cradle to said axles, said drive means being supported in overlapped position from said side frame members.

31. A truck frame comprising longitudinally extending side frame members spaced apart by rigid transverse spacing members, a body supporting member, links pivotally connected directly between said frame and the ends of said body supporting member mounting the same for transverse swinging movement between said side frame members, said links being journalled to prevent their movement out of a transverse plane and preventing vertical movement of said body supporting member, transverse drive axles at opposite ends of said frame, and independent drive means for each axle supported at one end on the spacing member remote from the respective axle and extending to said axle out of contact with said body supporting member and the intermediate spacing member, said drive means being in laterally offset relation with their supported ends overlapping longitudinally.

32. The frame of claim 31 further characterized in resilient means cushioning the frame relative to said axles, and means allowing movement of at least a portion of said drive means in accordance with relative movement between said frame and axles.

33. In a rail truck, a side frame member having axle journals at the ends thereof, a longitudinally arranged leaf spring rigidly supported intermediate its ends at the center of said member, equalizer means extending between said axle journals and having a dropped center portion below the intermediate portion of said side frame member, links pivotally connecting the ends of said spring to said equalizer means, and coil springs reacting between said side frame member and said dropped portion of said equalizer means.

34. In a rail truck, a longitudinally extending side frame member, equalizer means having a dropped center portion beneath the intermediate portion of said side frame member, a leaf spring rigidly secured at its center to the underside of the intermediate portion of said side frame member, links carried by said equalizer means adjacent opposite ends of said dropped center portion and supporting the ends of said leaf spring, and coil spring means seated in said dropped center portion of said equalizer means and reacting against said side frame member.

35. In a rail truck, a longitudinally extending side frame member, equalizer means having a dropped center portion beneath the intermediate portion of said side frame member, a leaf spring rigidly secured at its center to the underside of the intermediate portion of said side frame member, links carried by said equalizer means adjacent opposite ends of said dropped center portion and supporting the ends of said leaf spring, and vertical coil spring means seated in opposite ends of said dropped center portion and reacting upwardly against said side frame member.

ROBERT J. BURROWS.
ALFRED O. WILLIAMS.